Figure 1:
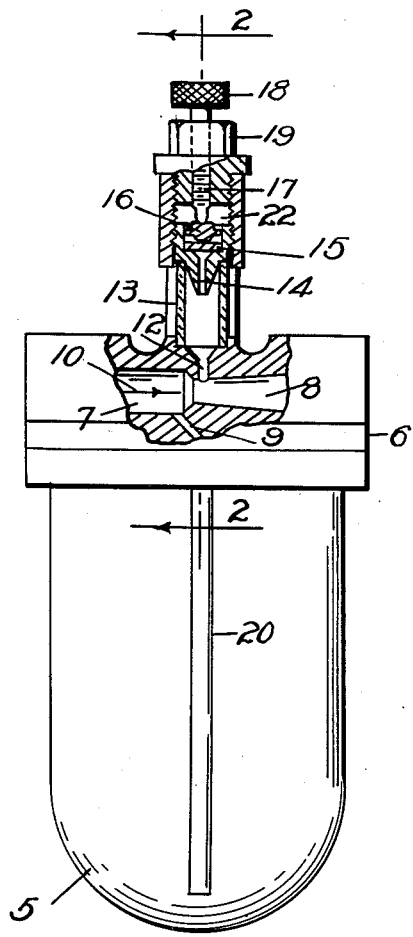

Jan. 19, 1943. C. A. NORGREN ET AL 2,308,773
LUBRICATOR
Filed June 9, 1941

INVENTORS.
Carl A. Norgren and
Per Gunnar Palmgren
BY
Rollandet, McGrew & Campbell
ATTORNEYS.

Patented Jan. 19, 1943

2,308,773

UNITED STATES PATENT OFFICE 2,308,773

LUBRICATOR

Carl A. Norgren, Denver, Colo., and Per Gunnar Palmgren, Philadelphia, Pa.

Application June 9, 1941, Serial No. 397,266

4 Claims. (Cl. 184—55)

This invention relates to improvements in lubricators for pneumatically operated devices or the like, particularly lubricators of the type disclosed in United States Patent No. 1,782,741, issued November 25, 1930, and United States Patent No. 2,223,700, issued December 3, 1940.

Lubricators of this type are connected into the compressed air line that supplies the pneumatic device. Another important use for such lubricators is to conduct a mixture of oil and air to lubricate bearings or any moving part, regardless of whether the device is pneumatically operated or not.

Such lubricators make use of the venturi principle whereby a moving flow of air draws oil from a reservoir into the air stream, whereby it is conducted to the parts to be lubricated.

Lubricators of this character are in extensive use and it has been found that where there is a considerable pressure differential between the high pressure side and the low pressure side of the venturi, accurate automatic metering of the oil becomes difficult with conventional needle valve control.

Furthermore, there may be wide variations in the velocity of the air passing through the venturi, resulting in fluctuations of the differential in pressure on opposite sides of the venturi, causing erratic and widely varying delivery of the oil.

A typical example of operating conditions that cause a relatively large pressure differential across the venturi is where a lubricator of this type is used to blow a mixture of oil and air into the bearings of a high speed grinding spindle or the like. In such an installation, the air blows through the bearings and out to the atmosphere, serving the triple useful purpose of lubricating the bearings, tending to cool the bearings and the moving parts, and blowing dirt and other foreign matter constantly away from the bearings. This relatively free flow of air even at low pressures, tends to create an excessive Venturi action which makes metering of the oil difficult with conventional lubricators of this type.

An erratic fluctuation of the air velocity and hence variation of air pressure differentials across the venturi may be caused where a lubricator of this character is connected into the compressed air line supplying a variable speed air motor, for instance.

Ordinarily, the flow of oil into the venturi has been governed by positioning of a needle valve or the like, but under the aforesaid circumstances, it may be necessary to so nearly close the needle valve resulting in a single annular oil-passing aperture at the valve, that is so extremely limited in area that surface tension in the oil, the presence of foreign matter in the oil or other factors may lead to a variable oil delivery with possible stoppage of the flow altogether. It is manifest that the unpredictable results of these varying conditions are undesirable and the general object of the present improvement in this art is to provide practical means for overcoming these difficulties.

More specifically, an object of the present invention is to provide in a lubricator of this type, a body of porous or fibrous material through which the oil must pass and which for physical reasons of resistance due to labyrinth action, capillarity, surface tension, friction and the like, contributes materially to governing and regulating the flow of oil or other fluid, while still maintaining a relatively great fluid-passing area.

Another object is to provide in such a device, a mass of porous or fibrous material that is compressible, together with cooperative means for selectively compressing it, whereby the minute conductive passages within the porous or fibrous body may selectively be regulated, thereby definitely governing the amount of oil or other fluid passing therethrough according to requirements.

Still another object is to provide in a pneumatic lubricator, means for cleaning and filtering the oil as it is fed into the flow of air.

Figure 2:
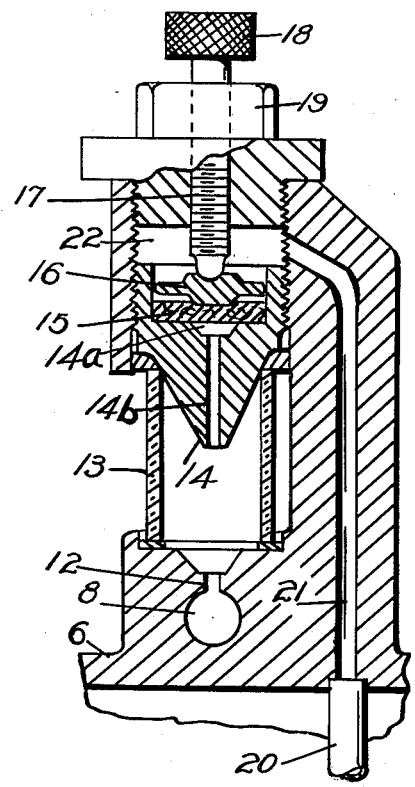

Other objects and advantages reside in details of design and construction which will be more fully disclosed in the following description and in the drawing wherein like parts have been similarly designated and in which:

Figure 1 is a front elevation partially in section, of a lubricator built according to the present inventive concept; and Figure 2 is a fragmentary sectional view taken along the line 2—2 of Figure 1 and drawn on a larger scale.

In order to disclose an operative reduction to practice of the present invention, the accompanying drawing will be described in some particularity. However, the instant example is merely typical and should not be construed to express or to imply any limitation to the invention, the scope of which is, in reality, measured by the appended claims.

First referring to Figure 1, reference character 5 denotes a bowl which, in the instant example, is made of transparent plastic material and which is for the purpose of holding a supply of oil. The bowl or reservoir 5 is topped by a closure 6 through which is provided an air conductive passage 7 inclusive of a Venturi portion 8 of reduced cross section.

On the high pressure side of the venturi, a small passage 9 connects the main air passage with the interior of the bowl or reservoir 5 to maintain air pressure therein. The direction of flow of air is indicated by arrow 10.

A relatively small oil passage 12 connects into the venturi 8 and also into the interior of a sight feed glass 13 that is preferably in an erect position as illustrated.

Extending downwardly into the interior of the sight feed glass 13 is an oil drip nozzle 14 in which is a body of porous or fibrous material 15 immediately above which is a washer or disk 16 having a projection that is normally in contact with the upper portion of the material 15.

A regulating set screw 17 is provided with a knurled head 18 and is positioned to cooperate with the disk 16 whereby said disk can be urged toward the porous or fibrous material 15 to compress selectively said material, thereby regulating its oil-conductive capacity. A packing gland 19 is provided around the screw 17.

An oil conductive tube 20 extends into the oil bowl or reservoir 5 and, as best illustrated in Figure 2, connects with an oil passage 21 that in turn connects with a closed chamber 22 immediately above the disk 16. The passage 21 is provided in a column that is part of the closure 6 and that helps to support the sight feed glass 13 and the elements positioned thereabove, the details of which are well and clearly illustrated in Figure 2.

It is manifest that as a flow of air under pressure passes in the direction of arrow 10 through conductor 7 and venturi 8, oil or other fluid will be drawn from bowl or reservoir 5 upward through tube 20 and passage 21 into chamber 22. Disk 16 is positioned in a suitable guiding recess in the upper portion of the nozzle element 14, but does not fit oil-tight therein, but rather permits oil to flow downwardly around its periphery and onto the mass of porous or fibrous material 15.

As the oil penetrates into and through the maze of small pores and passages within the mass of material, it is filtered and cleaned of any solid foreign matter that may be present therein.

The oil will pass slowly through the porous or fibrous material 15 and down through the lower open end of the drip nozzle 14, in the form of drops visible through the sight feed glass 13, thence through the passage 12 and into the air stream flowing through the venturi 8. In the air stream the oil will be broken up into fine particles or atomized, and this mixture will be conducted to the parts to be lubricated.

The mass of porous or fibrous material 15 contributes to retarding, governing and dependably controlling the flow of oil through the device. It has been found that by virtue of this improvement, unpredictable flow performance due to erratic air velocities or relatively high air pressure drops across the venturi, may be dependably controlled and rendered automatic throughout indefinite periods of time.

Furthermore, by regulating the pressure of the disk 16 by means of the hand-screw 17—18, upon the mass of porous or fibrous material 15, the conductive capacity of the material 15 can be regulated. In other words, the position of the screw 17 readily and dependably may be used to govern the amount of oil or other fluid that will pass through the material 15, i. e., the number of drops per minute that will be fed by the lubricator.

It is manifest that according to the instant example, oil is flowed downwardly upon the mass of porous or fibrous material 15 adjacent the periphery thereof, whence it penetrates through the maze of pores and openings therein toward the central opening of the nozzle, subject to a zone of pressure or compression within the material 15, that may be selectively controlled by means of hand-screw 17—18 acting upon disk 16, which in turn is positioned to act upon the mass of porous or fibrous material 15.

It will be noted that immediately below the material 15 is a central funnel-like opening 14a within the nozzle 14 and which is in conductive communication with the central drip passage 14b of the nozzle. Immediately above the mass of material 15 is a downward projection on the lower surface of the disk 16 that corresponds with the internal shape of the opening 14a. Obviously, as the disk 16 is forced downwardly toward the fibrous or porous material 15, a portion of said material will be forced downwardly into the opening 14a to a certain extent, and at the same time, a zone of compression will be established that dependably will govern and regulate the flow of oil through the material 15 toward the central opening 14a and thence to the normal drip passage 14b through the nozzle 14. A highly satisfactory material of which to make the component mass 15 is one or more disks or layers of felt. However, the invention is not limited to any specific material since other porous or fibrous bodies having the disclosed characteristics may be used.

It has been stated hereinbefore that the body 15 of porous or fibrous material somewhat retards the flow of oil. While this is true, nevertheless the suction effect produced by the pressure differential across the venturi, i. e., the difference in pressure between the interior of the bowl 5 and the interior of the venturi 8 adjacent the passage 12, will readily act through the porous or fibrous material 15 to draw oil up into chamber 22, whence its downward flow will be regulated and stabilized due to the factors of conductive capacity, viscosity and friction, as the oil passes through the many small pores and openings in the material 15.

It is manifest that different operating conditions will require different settings of the control screw 17—18, and the other factors in the lubricator are designed and coordinated to supply the maximum of lubricant that may be required, and are subject to the position of screw 17—18. When the regulating screw 17—18 has once been set to supply the optimum number of drops of oil per minute, then the oil feed will be constant and dependable and not subject to the erratic action and trouble under circumstances hereinbefore pointed out. This is true throughout a period of operation of the machine being serviced by the lubricator and it is also true that the setting will remain dependable between periods of operation without further attention so that even though a machine may be shut down for a considerable period of time, nevertheless the lubricator will immediately start functioning properly when operation of the machine serviced thereby is resumed.

In the following claims, the term "reservoir for oil" may be considered as element 5, the air flow passage element 7—8, and the oil-conductive passageway connecting the oil reservoir with the air flow passage comprises parts 20—21—22—14—14a—14b—13—12. The mass or body of porous or fibrous material is component 15, the disk having a boss-like projection is member 16, and the means for acting upon the disk is element 17—18.

What we claim and desire to secure by Letters Patent is:

1. In a sight feed lubricator of the character disclosed inclusive of a reservoir for oil, a Venturi air flow passage, and an oil conductive passageway leading from said reservoir to said air passage, the improvement which comprises a body of porous material positioned in said oil passageway and filling the cross section thereof, and means inclusive of a non-porous disk positioned to act upon said porous material, and a screw in thrust engagement with the disk for selectively compressing said body of fibrous material.

2. In a sight feed lubricator of the character disclosed inclusive of a reservoir for oil, a Venturi air flow passage, and an oil conductive passageway leading from said reservoir to said air passage, the improvement which comprises a disk of porous material positioned in said oil passageway and filling the cross section thereof, the cross sectional area of the passageway on one side of the body of porous material being less than that of the passageway on the other side of the material thus forming a shoulder upon which said material bears, a non-porous disk positioned in the larger diameter portion of the passageway adjacent said porous material and having a boss-like projection extending toward said material for contact therewith, the perimeter of the disk permitting flow of oil therepast, and means for urging the disk toward the porous material whereby the latter may be selectively compressed.

3. In a sight feed lubricator of the character disclosed inclusive of a reservoir for oil, a venturi air flow passage, and an oil conductive passageway leading from said reservoir to said air passage, the improvement which comprises a disk of porous material positioned in said oil passageway and filling the cross section thereof, the cross sectional area of the passageway on one side of the body of porous material being less than that of the passageway on the other side of the material thus forming a shoulder upon which said porous material bears, a non-porous disk positioned in the larger diameter portion of the passageway adjacent said porous material and having a boss-like central projection extending toward said material for contact therewith, the perimeter of the disk being of a size to permit flow of oil therepast, and means for urging the disk toward the porous material whereby a central zone of compression may be selectively established in said body of porous material thereby controlling its fluid-conducting capacity.

4. A lubricator of the character disclosed comprising a bowl for oil, a Venturi air passage positioned thereabove and associated therewith, an oil conductive passageway leading from the interior of said bowl to a position above said air passage and adjacent thereto, a nozzle having a central vertically-extending oil hole fitted into said oil passageway, a disk of porous material positioned in the oil passageway and covering the upper end of the oil hole in said nozzle, means for compressing said porous material to establish a zone of compression therein in axial alinement with the hole in the nozzle, and a sight feed glass surrounding the lower end of said nozzle and in conductive communication with said Venturi air passage.

CARL A. NORGREN.
PER GUNNAR PALMGREN.